(12) United States Patent
Sugai

(10) Patent No.: US 7,983,833 B2
(45) Date of Patent: Jul. 19, 2011

(54) INTERNAL COMBUSTION ENGINE SYSTEM, CONTROL METHOD OF INTERNAL COMBUSTION ENGINE SYSTEM, AND POWER OUTPUT APPARATUS

(75) Inventor: Shinichi Sugai, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 266 days.

(21) Appl. No.: 12/162,903

(22) PCT Filed: Nov. 29, 2006

(86) PCT No.: PCT/JP2006/323777
§ 371 (c)(1),
(2), (4) Date: Jul. 31, 2008

(87) PCT Pub. No.: WO2007/088669
PCT Pub. Date: Aug. 9, 2007

(65) Prior Publication Data
US 2009/0030595 A1    Jan. 29, 2009

(30) Foreign Application Priority Data
Feb. 2, 2006 (JP) .................... 2006-025623

(51) Int. Cl.
*G06F 19/00* (2006.01)
(52) U.S. Cl. .................... 701/112; 123/179.4
(58) Field of Classification Search ............ 701/112, 701/113; 123/434, 436, 198 DB, 179.4
See application file for complete search history.

(56) References Cited

U.S. PATENT DOCUMENTS

| | | | |
|---|---|---|---|
| 5,159,990 A * | 11/1992 | Abe et al. ............ | 180/197 |
| 5,774,822 A * | 6/1998 | Maki et al. ............ | 701/104 |
| 6,260,535 B1 | 7/2001 | Froeschl et al. | |
| 6,772,723 B2 * | 8/2004 | Aoki et al. ............ | 123/179.4 |
| 2003/0041831 A1 * | 3/2003 | Aoki et al. ............ | 123/179.4 |
| 2003/0163244 A1 | 8/2003 | Ando et al. | |
| 2006/0048734 A1 | 3/2006 | Kataoka et al. | |
| 2006/0266323 A1 * | 11/2006 | Ogimura ............ | 123/198 A |
| 2008/0257312 A1 * | 10/2008 | Hasegawa et al. ....... | 123/491 |

(Continued)

FOREIGN PATENT DOCUMENTS

JP     05-149221 A     6/1993
(Continued)

*Primary Examiner* — John T Kwon
(74) *Attorney, Agent, or Firm* — Sughrue Mion, PLLC

(57) ABSTRACT

At a time of stopping operation of an engine, after elapse of a preset time period since start of self-sustaining operation of the engine at a stop rotation speed Nstop, the drive control sets a torque command Tm1* of a motor MG1 to a rotation speed-decreasing, vibration-suppressing torque and starts decreasing a rotation speed Ne of the engine (steps S100, S140, S150, S170, and S180). The rotation speed-decreasing, vibration-suppressing torque is set to smoothly decrease the rotation speed of the engine and suppress the potential vibration caused by the decreased rotation of the engine. A correction torque Tmod is set based on a crank angle CA and an engine water temperature Tw at the rotation speed Ne of the engine decreasing to a preset reference speed Nref (step S200). The torque command Tm1* of the motor MG1 is then set by adding the set correction torque Tmod to the rotation speed-decreasing, vibration-suppressing torque (step S210). This arrangement effectively prevents the crank angle CA from exceeding a top dead center immediately before the stop of the engine and thereby suppresses the potential vibration causes by the excess of the crank angle CA over the top dead center.

4 Claims, 8 Drawing Sheets

U.S. PATENT DOCUMENTS

2009/0030595 A1 * 1/2009 Sugai .................... 701/112

FOREIGN PATENT DOCUMENTS

| | | | |
|---|---|---|---|
| JP | 2000-145494 A | 5/2000 | |
| JP | 2001-173473 A | 6/2001 | |
| JP | 2001-207885 A | 8/2001 | |
| JP | 2003-314341 A | 11/2003 | |
| JP | 2004-263566 A | 9/2004 | |
| JP | 2005-009449 A | 1/2005 | |
| JP | 2005-042560 A | 2/2005 | |

* cited by examiner

INTERNAL COMBUSTION ENGINE SYSTEM, CONTROL METHOD OF INTERNAL COMBUSTION ENGINE SYSTEM, AND POWER OUTPUT APPARATUS

CROSS REFERENCE TO RELATED APPLICATIONS

This application is a National Stage of International Application No. PCT/JP2006/323777 filed Nov. 29, 2006, claiming priority based on Japanese Patent Application No. 2006-025623, filed Feb. 2, 2006, the contents of which are incorporated herein by reference in their entirety.

FIELD OF THE INVENTION

The present invention relates to an internal combustion engine system, a control method of the internal combustion engine system, and a power output apparatus.

DESCRIPTION OF THE RELATED ART

In a proposed structure of an internal combustion engine system, a motor is controlled to output a torque in a torque variation pattern based on a crank angle at an engine rotation speed reaching a ready-to-stop rotation speed in the course of stopping the operation of an engine (see, for example, Japanese Patent Laid-Open No. 2005-42560). The torque output in this torque variation pattern stops the engine at a crank position advantageous for restart of the engine.

SUMMARY OF THE INVENTION

In the internal combustion engine system mounted on the hybrid vehicle, the operation of the engine is stopped and restarted at relatively frequent intervals. For the quick engine restart and favorable startability, it is important to stop the engine at the desired crank position advantageous for restart of the engine. For the good ride of the driver and the passengers, it is important to suppress the potential vibration that may arise in the course of stopping the operation of the engine.

In the internal combustion engine system, the control method of the internal combustion engine system, and the power output apparatus, there would thus be a demand for suppressing potential vibration that may arise in the course of stopping operation of an internal combustion engine. In the internal combustion engine system, the control method of the internal combustion engine system, and the power output apparatus, there would also be a demand for enabling the internal combustion engine to stop at a desired rotational position.

The present invention accomplishes at least part of the demands mentioned above and the other relevant demands by the following configurations applied to the internal combustion engine system, the control method of the internal combustion engine system, and the power output apparatus.

According to one aspect, the invention is directed to an internal combustion engine system that includes an internal combustion engine and a motor configured to enable torque output to an output shaft of the internal combustion engine. The internal combustion engine system includes: a rotational position sensor constructed to detect a rotational position of the output shaft of the internal combustion engine; a rotation speed sensor constructed to measure a rotation speed of the internal combustion engine as an engine rotation speed; and an engine stop-time controller configured to, in response to a request for stopping operation of the internal combustion engine, control the internal combustion engine to stop fuel supply to the internal combustion engine and ignition. Until the engine rotation speed measured by the rotation speed sensor decreases to a correction start rotation speed, the engine stop-time controller controls the motor to output a rotation speed-decreasing torque that is a torque for smoothly decreasing the rotation speed of the internal combustion engine. After the engine rotation speed measured by the rotation speed sensor decreases to the correction start rotation speed, with a view to preventing the rotational position of the output shaft from exceeding a top dead center immediately before a stop of the internal combustion engine, the engine stop-time controller controls the motor to output an engine stop torque as a sum of a correction torque and the rotation speed-decreasing torque. The correction torque is set corresponding to the rotational position of the output shaft detected by the rotational position sensor at the measured engine rotation speed decreasing to the correction start rotation speed.

In response to the request for stopping operation of the internal combustion engine, the internal combustion engine system according to one aspect of the invention controls the internal combustion engine to stop the fuel supply to the internal combustion engine and the ignition. Until the rotation speed of the internal combustion engine or the engine rotation speed decreases to the correction start rotation speed, the internal combustion engine system controls the motor, which is configured to enable torque output to the output shaft of the internal combustion engine, to output the rotation speed-decreasing torque as the torque for smoothly decreasing the rotation speed of the internal combustion engine. After the engine rotation speed decreases to the correction start rotation speed, with a view to preventing the rotational position of the output shaft from exceeding the top dead center immediately before the stop of the internal combustion engine, the internal combustion engine system controls the motor to output the engine stop torque as the sum of the correction torque and the rotation speed-decreasing torque. Here the correction torque is set corresponding to the rotational position of the output shaft of the internal combustion engine at the engine rotation speed decreasing to the correction start rotation speed. This arrangement effectively prevents the rotational position of the output shaft of the internal combustion engine from exceeding the top dead center immediately before the stop of the internal combustion engine and thereby suppresses the potential vibration caused by the excess of the rotational position over the top dead center immediately before the stop of the internal combustion engine.

In one preferable application of the internal combustion engine system according to the invention, the engine stop-time controller sets the correction torque to an adjustment torque for adjusting the rotational position of the output shaft to an angle range of 30 degrees to 60 degrees before the top dead center at the stop of the internal combustion engine. This arrangement more effectively prevents the rotational position of the output shaft of the internal combustion engine from exceeding the top dead center immediately before the stop of the internal combustion engine.

In another preferable application of the internal combustion engine system according to the invention, the engine stop-time controller controls the internal combustion engine to stop the fuel supply to the internal combustion engine and the ignition after operation of the internal combustion engine at a preset rotation speed of higher than the correction start rotation speed for a preset time period. This arrangement enables the operation stop of the internal combustion engine from a stable operation state at the preset rotation speed and thus ensures the operation stop of the internal combustion engine before an excess of the rotational position of the output shaft over the top dead center.

In one preferable embodiment according to the above aspect of the invention, the internal combustion engine system further includes a temperature sensor constructed to measure a temperature of a medium reflecting a temperature of the internal combustion engine. The engine stop-time controller may use a torque corresponding to the temperature measured by the temperature sensor at the measured engine rotation speed decreasing to the correction start rotation speed, as the correction torque. This arrangement uses the correction torque corresponding to the temperature of the internal combustion engine and thus ensures the operation stop of the internal combustion engine before an excess of the rotational position of the output shaft over the top dead center. In the internal combustion engine system of this embodiment, the engine stop-time controller may use the rotation speed-decreasing torque as the engine stop torque when the temperature measured by the temperature sensor is less than a preset reference temperature at the measured engine rotation speed decreasing to the correction start rotation speed. Under the low temperature condition of the internal combustion engine, the internal combustion engine is often under non-ordinary control, for example, warm-up acceleration control. In this state, the correction of the rotation speed-decreasing torque with the correction torque often does not attain the expected effect of preventing an excess of the rotational position over the top dead center. Such ineffective correction is omitted to simplify the control.

According to another aspect, the invention is directed to a power output apparatus constructed to output power to a driveshaft. The power output apparatus includes: an internal combustion engine; a first motor configured to enable torque output to an output shaft of the internal combustion engine; a three shaft-type power input output structure connected to three shafts, the output shaft of the internal combustion engine, the driveshaft, and a rotating shaft of the first motor, and designed to input and output power to a residual shaft based on powers input from and output to any two shafts among the three shafts; a second motor configured to enable torque output to the driveshaft; an accumulator arranged to transmit electric power to and from the first motor and the second motor; a rotational position sensor constructed to detect a rotational position of the output shaft of the internal combustion engine; a rotation speed sensor constructed to measure a rotation speed of the internal combustion engine as an engine rotation speed; and a controller configured to control the internal combustion engine, the first motor, and the second motor to ensure output of a torque equivalent to a torque demand, which is required for the driveshaft, to the driveshaft irrespective of intermittent operation of the internal combustion engine. In response to a request for stopping operation of the internal combustion engine, the controller controls the internal combustion engine to stop fuel supply to the internal combustion engine and ignition. Until the engine rotation speed measured by the rotation speed sensor decreases to a correction start rotation speed, the controller controls the first motor to output a rotation speed-decreasing torque that is a torque for smoothly decreasing the rotation speed of the internal combustion engine. After the engine rotation speed measured by the rotation speed sensor decreases to the correction start rotation speed, with a view to preventing the rotational position of the output shaft from exceeding a top dead center immediately before a stop of the internal combustion engine, the controller controls the first motor to output an engine stop torque as a sum of a correction torque and the rotation speed-decreasing torque. The correction torque is set corresponding to the rotational position of the output shaft detected by the rotational position sensor at the measured engine rotation speed decreasing to the correction start rotation speed. The controller controls the internal combustion engine, the first motor, and the second motor to stop the operation of the internal combustion engine and to ensure output of the torque equivalent to the torque demand to the driveshaft even at the stop of the operation of the internal combustion engine.

In response to the request for stopping operation of the internal combustion engine, the power output apparatus according to one aspect of the invention controls the internal combustion engine to stop the fuel supply to the internal combustion engine and the ignition. Until the rotation speed of the internal combustion engine or the engine rotation speed decreases to the correction start rotation speed, the power output apparatus controls the first motor, which is configured to enable torque output to the output shaft of the internal combustion engine, to output the rotation speed-decreasing torque as the torque for smoothly decreasing the rotation speed of the internal combustion engine. After the engine rotation speed decreases to the correction start rotation speed, with a view to preventing the rotational position of the output shaft from exceeding the top dead center immediately before the stop of the internal combustion engine, the power output apparatus controls the first motor to output the engine stop torque as the sum of the correction torque and the rotation speed-decreasing torque. Here the correction torque is set corresponding to the rotational position of the output shaft of the internal combustion engine at the engine rotation speed decreasing to the correction start rotation speed. This arrangement effectively prevents the rotational position of the output shaft of the internal combustion engine from exceeding the top dead center immediately before the stop of the internal combustion engine and thereby suppresses the potential vibration caused by the excess of the rotational position over the top dead center immediately before the stop of the internal combustion engine. A vehicle equipped with such a power output apparatus desirably suppresses the potential vibration that may arise during the intermittent operation of the internal combustion engine.

In one preferable application of the power output apparatus according to the invention, the controller sets the correction torque to an adjustment torque for adjusting the rotational position of the output shaft to an angle range of 30 degrees to 60 degrees before the top dead center at the stop of the internal combustion engine. This arrangement more effectively prevents the rotational position of the output shaft of the internal combustion engine from exceeding the top dead center immediately before the stop of the internal combustion engine.

In another preferable application of the power output apparatus according to the invention, the controller controls the internal combustion engine to stop the fuel supply to the internal combustion engine and the ignition after operation of the internal combustion engine at a preset rotation speed of higher than the correction start rotation speed for a preset time period. This arrangement enables the operation stop of the internal combustion engine from a stable operation state at the preset rotation speed and thus ensures the operation stop of the internal combustion engine before an excess of the rotational position of the output shaft over the top dead center.

In one preferable embodiment according to the above aspect of the invention, the power output apparatus further includes: a temperature sensor constructed to measure a temperature of a medium reflecting a temperature of the internal combustion engine. The controller may use a torque corresponding to the temperature measured by the temperature sensor at the measured engine rotation speed decreasing to the correction start rotation speed, as the correction torque. This arrangement uses the correction torque corresponding to the temperature of the internal combustion engine and thus ensures the operation stop of the internal combustion engine before an excess of the rotational position of the output shaft over the top dead center. In the power output apparatus of this embodiment, the controller may use the rotation speed-decreasing torque as the engine stop torque when the temperature measured by the temperature sensor is less than a preset reference temperature at the measured engine rotation speed decreasing to the correction start rotation speed. Under the low temperature condition of the internal combustion engine, the internal combustion engine is often under non-ordinary control, for example, warm-up acceleration control. In this state, the correction of the rotation speed-decreasing torque with the correction torque often does not attain the expected effect of preventing an excess of the rotational position over the top dead center. Such ineffective correction is omitted to simplify the control.

According to still another aspect, the invention is directed to a control method of an internal combustion engine system that includes an internal combustion engine and a motor configured to enable torque output to an output shaft of the internal combustion engine. At a time of stopping operation of the internal combustion engine, the control method controls the internal combustion engine to stop fuel supply to the internal combustion engine and ignition. Until a rotation speed of the internal combustion engine decreases to a correction start rotation speed, the control method controls the motor to output a rotation speed-decreasing torque that is a torque for smoothly decreasing the rotation speed of the internal combustion engine. After the rotation speed of the internal combustion engine decreases to the correction start rotation speed, the control method controls the motor to output an engine stop torque as a sum of a correction torque and the rotation speed-decreasing torque and stops the operation of the internal combustion engine. The correction torque is set corresponding to the rotational position of the output shaft of the internal combustion engine at the rotation speed of the internal combustion engine decreasing to the correction start rotation speed.

At the time of stopping the operation of the internal combustion engine, the control method of the internal combustion engine system according to the above aspect of the invention controls the internal combustion engine to stop the fuel supply to the internal combustion engine and the ignition. Until the rotation speed of the internal combustion engine decreases to the correction start rotation speed, the control method controls the motor, which is configured to enable torque output to the output shaft of the internal combustion engine, to output the rotation speed-decreasing torque as the torque for smoothly decreasing the rotation speed of the internal combustion engine. After the rotation speed of the internal combustion engine decreases to the correction start rotation speed, with a view to preventing the rotational position of the output shaft of the internal combustion engine from exceeding the top dead center immediately before the stop of the internal combustion engine, the control method controls the motor to output the engine stop torque as the sum of the correction torque and the rotation speed-decreasing torque. The correction torque is set corresponding to the rotational position of the output shaft of the internal combustion engine at the rotation speed of the internal combustion engine decreasing to the correction start rotation speed. This arrangement effectively prevents the rotational position of the output shaft of the internal combustion engine from exceeding the top dead center immediately before the stop of the internal combustion engine and thereby suppresses the potential vibration caused by the excess of the rotational position over the top dead center immediately before the stop of the internal combustion engine.

DESCRIPTION OF THE PREFERRED EMBODIMENTS

Figure 1:
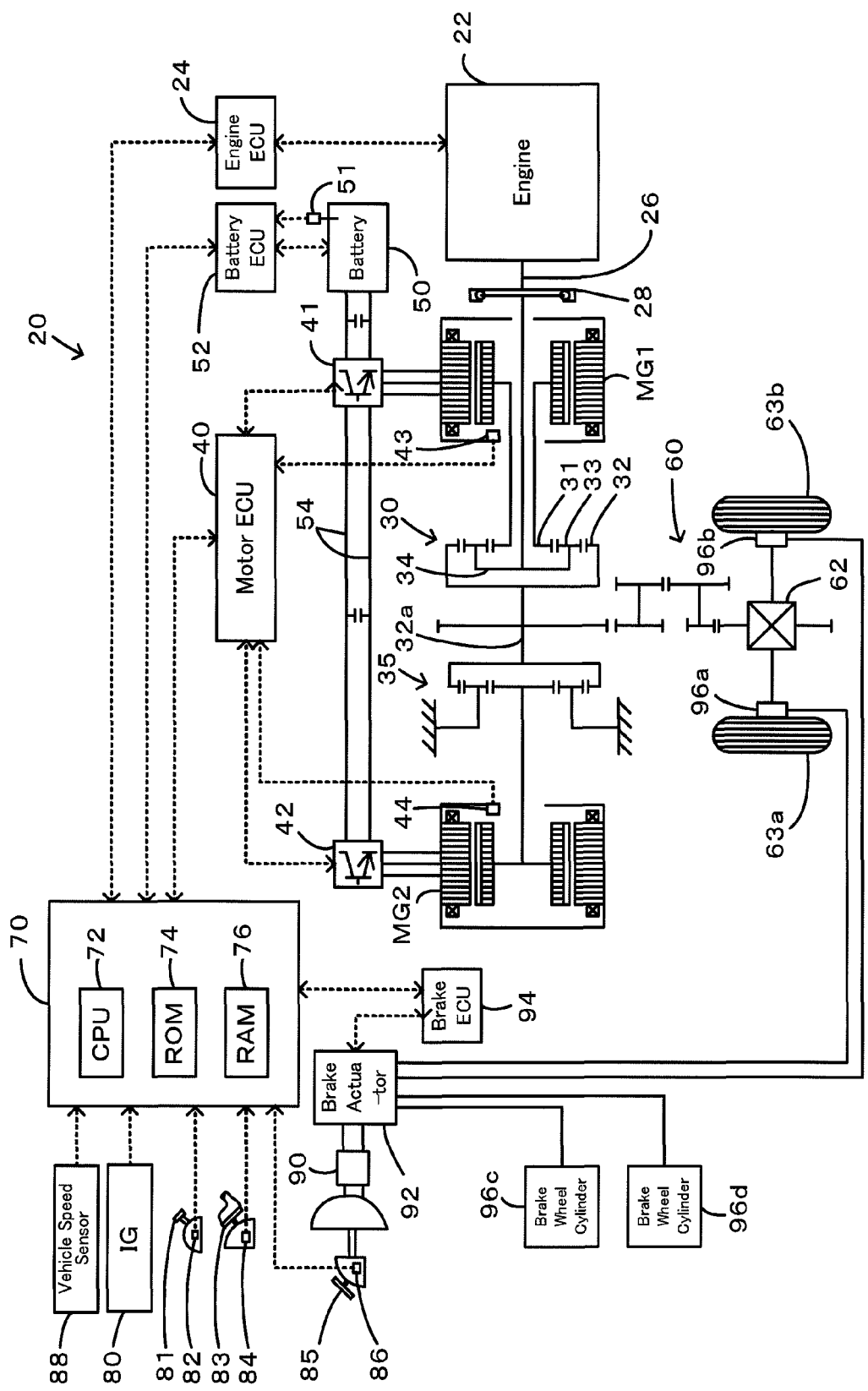
FIG. 1 schematically illustrates the configuration of a hybrid vehicle in one embodiment of the invention.

One mode of carrying out the invention is described below as a preferred embodiment with reference to the accompanied drawings. FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 connected to a crankshaft 26 as an output shaft of the engine 22 via a damper 28, a motor MG1 linked with the power distribution integration mechanism 30 and arranged to have power generation capability, a reduction gear 35 attached to a ring gear shaft 32a or a driveshaft linked with the power distribution integration mechanism 30, a motor MG2 connected with the reduction gear 35, a brake actuator 92 arranged to control brakes of drive wheels 63a and 63b and driven wheels (not shown), and a hybrid electronic control unit 70 configured to control the operations of the whole power output apparatus.

Figure 2:
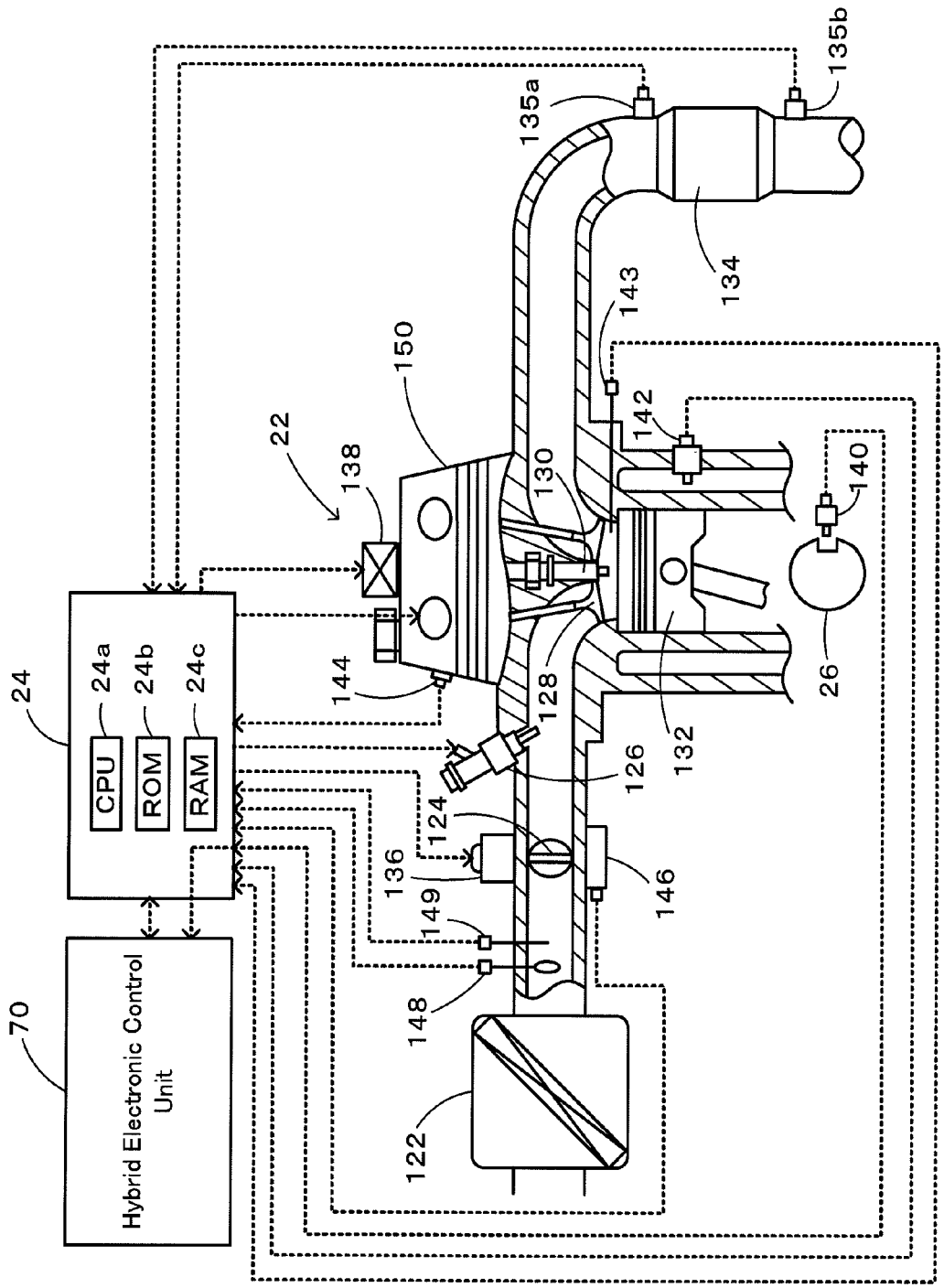
FIG. 2 shows the schematic structure of an engine mounted on the hybrid vehicle of the embodiment.

The engine 22 is constructed as a V-six internal combustion engine designed to consume a hydrocarbon fuel, such as gasoline or light oil, and thereby generate power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 designed to convert toxic components included in the exhaust, that is, carbon monoxide (CO), hydrocarbons (HC), and nitrogen oxides (NOx), into harmless components and is discharged to the outside air. The fuel injection valves 126 are provided independently for the six cylinders to enable fuel injection in the respective cylinders.

The engine 22 is under control of an engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure Pin from a pressure sensor 143 located in the combustion chamber, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an air flow meter signal AF from an air flow meter 148 located in an air intake conduit, an intake air temperature from a temperature sensor 149 located in the air intake conduit, an air-fuel ratio from an air fuel ratio sensor 135a attached to the exhaust conduit in the upstream of the catalytic converter 134, an oxygen signal Ox from an oxygen sensor 135b attached to the exhaust conduit in the downstream of the catalytic converter 134. The engine ECU 24 outputs, via its output port, diverse control signals and driving signals to drive and control the engine 22. The signals output from the engine ECU 24 include driving signals to the fuel injection valve 126, driving signals to a throttle motor 136 driven to regulate the position of the throttle valve 124, control signals to an ignition coil 138 integrated with an igniter, and control signals to a variable valve timing mechanism 150 to vary the open and close timings of the intake valve 128. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The brake actuator 92 regulates the hydraulic pressures of brake wheel cylinders 96a to 96d to enable application of a brake torque to the drive wheels 63a and 63b and to driven wheels (not shown), which satisfies a brake share of a total required braking force for the hybrid vehicle 20 determined according to the vehicle speed V and the pressure of a brake master cylinder 90 (brake pressure) in response to the driver's depression of a brake pedal 85, while regulating the hydraulic pressures of the brake wheel cylinders 96a through 96d to enable application of the brake torque to the drive wheels 63a and 63b and to the driven wheels, independently of the driver's depression of the brake pedal 85. The brake actuator 92 is under control of a brake electronic control unit (hereafter referred to as brake ECU) 94. The brake ECU 94 inputs signals from various sensors through signal lines (not shown), for example, wheel speeds from wheel speed sensors (not shown) attached to the drive wheels 63a and 63b and the driven wheels and a steering angle from a steering angle sensor (not shown). The brake ECU 94 performs antilock braking system (ABS) control for preventing a lock of any of the drive wheels 63a and 63b and the driven wheels from occurring in response to the driver's depression of the brake pedal 85, traction control (TRC) for preventing a slip of either of the drive wheels 63a and 63b from occurring in response to the driver's depression of an accelerator pedal 83, and vehicle stability control (VSC) for keeping the stability of the hybrid vehicle 20 in a turn. The brake ECU 94 establishes communication with the hybrid electronic control unit 70 to drive and control the brake actuator 92 in response to control signals from the hybrid electronic control unit 70 and to output data regarding the operating conditions of the brake actuator 92 to the hybrid electronic control unit 70 according to the requirements.

The hybrid electronic control unit 70 is constructed as a microcomputer including a CPU 72, a ROM 74 configured to store processing programs, a RAM 76 configured to temporarily store data, input and output ports (not shown), and a communication port (not shown). The hybrid electronic control unit 70 inputs, via its input port, an ignition signal from an ignition switch 80, a gearshift position SP or a current setting position of a gearshift lever 81 from a gearshift position sensor 82, an accelerator opening Acc or the driver's depression amount of the accelerator pedal 83 from an accelerator pedal position sensor 84, a brake pedal position BP or the driver's depression amount of the brake pedal 85 from a brake pedal position sensor 86, and the vehicle speed V from a vehicle speed sensor 88. The hybrid electronic control unit 70 also inputs a crank position from a crank position sensor 140 via the engine ECU 24. The hybrid electronic control unit 70 makes connection with the engine ECU 24, the motor ECU 40, the battery ECU 52, and the brake ECU 94 via its communication port to transmit various control signals and data to and from the engine ECU 24, the motor ECU 40, the battery ECU 52, and the brake ECU 94 as mentioned previously.

The hybrid vehicle 20 of the embodiment thus constructed calculates a torque demand to be output to the ring gear shaft 32a functioning as the drive shaft, based on observed values of the vehicle speed V and the accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
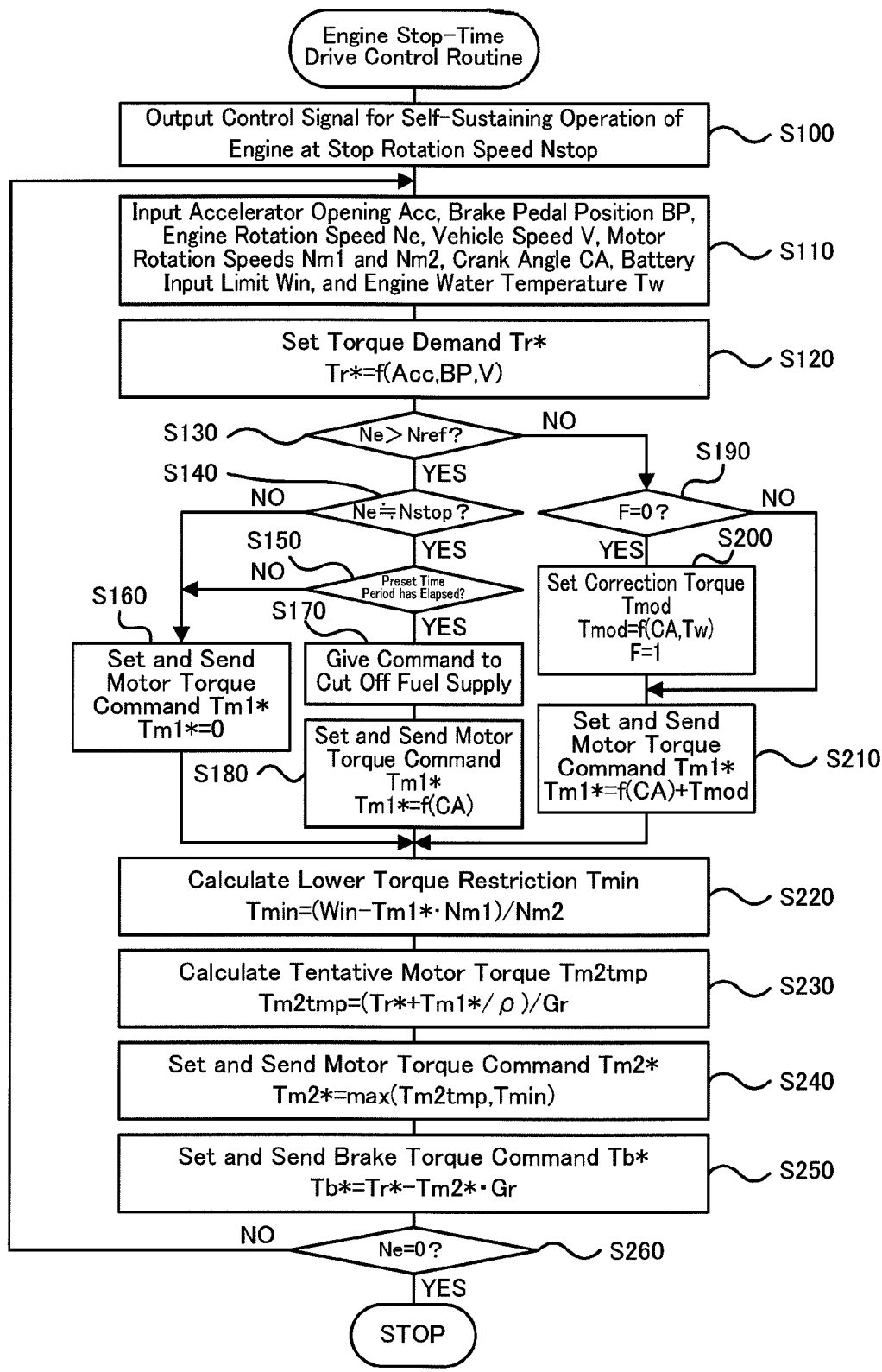
FIG. 3 is a flowchart showing an engine stop-time drive control routine executed by a hybrid electronic control unit included in the hybrid vehicle of the embodiment.

The following describes the operations of the hybrid vehicle 20 of the embodiment having the configuration discussed above, especially a series of operation control to stop the operation of the engine 22. The engine operation stop control is performed, for example, when a vehicle power demand required for the hybrid vehicle 20 according to the accelerator opening Acc, the vehicle speed V, and the state of charge of the battery 50 is less than a preset reference level and when there is no other requirement for continued operation of the engine 22 under the condition that the vehicle speed V is lower than an engine stop reference speed. FIG. 3 is a flowchart showing an engine stop-time drive control routine executed by the hybrid electronic control unit 70. This drive routine is activated in response to a request for stopping the operation of the engine 22.

On the start of the engine stop-time drive control routine, the CPU 72 of the hybrid electronic control unit 70 first outputs a control signal to the engine ECU 24 for self-sustaining operation of the engine 22 at a stop rotation speed Nstop that is slightly higher than an idle rotation speed (step S100). The stop rotation speed Nstop is set in a low rotation speed area out of an allowable rotation speed range for stable operation of the engine 22 and is, for example, 900 rpm or 1000 rpm. The self-sustaining operation of the engine 22 at the stop rotation speed Nstop in the course of the engine operation stop ensures a steady decrease in rotation speed of the engine 22 after stop of fuel injection.

The CPU 72 subsequently inputs various data required for control, for example, the accelerator opening Acc from the accelerator pedal position sensor 84, the brake pedal position BP from the brake pedal position sensor 86, the vehicle speed V from the vehicle speed sensor 88, a rotation speed Ne of the engine 22, rotation speeds Nm1 and Nm2 of the motors MG1 and MG2, a crank angle CA from the crank position sensor 140, an input limit Win of the battery 50, and an engine water temperature Tw (step S110). The rotation speed Ne of the engine 22 is computed from the crank position detected by the crank position sensor 1410. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The crank angle CA is obtained by converting the crank position detected by the crank position sensor 140 into an angle from a preset reference angle. The input limit Win of the battery 50 is set based on the battery temperature Tb of the battery 50 measured by the temperature sensor 51 and the state of charge (SOC) of the battery 50 and is received from the battery ECU 52 by communication. The input limit Win is expressed by a negative value and decreases with an increase in allowable electric power input into the battery 50. The engine water temperature Tw is measured by the water temperature sensor 142 and is received from the engine ECU 24 by communication.

Figure 4:
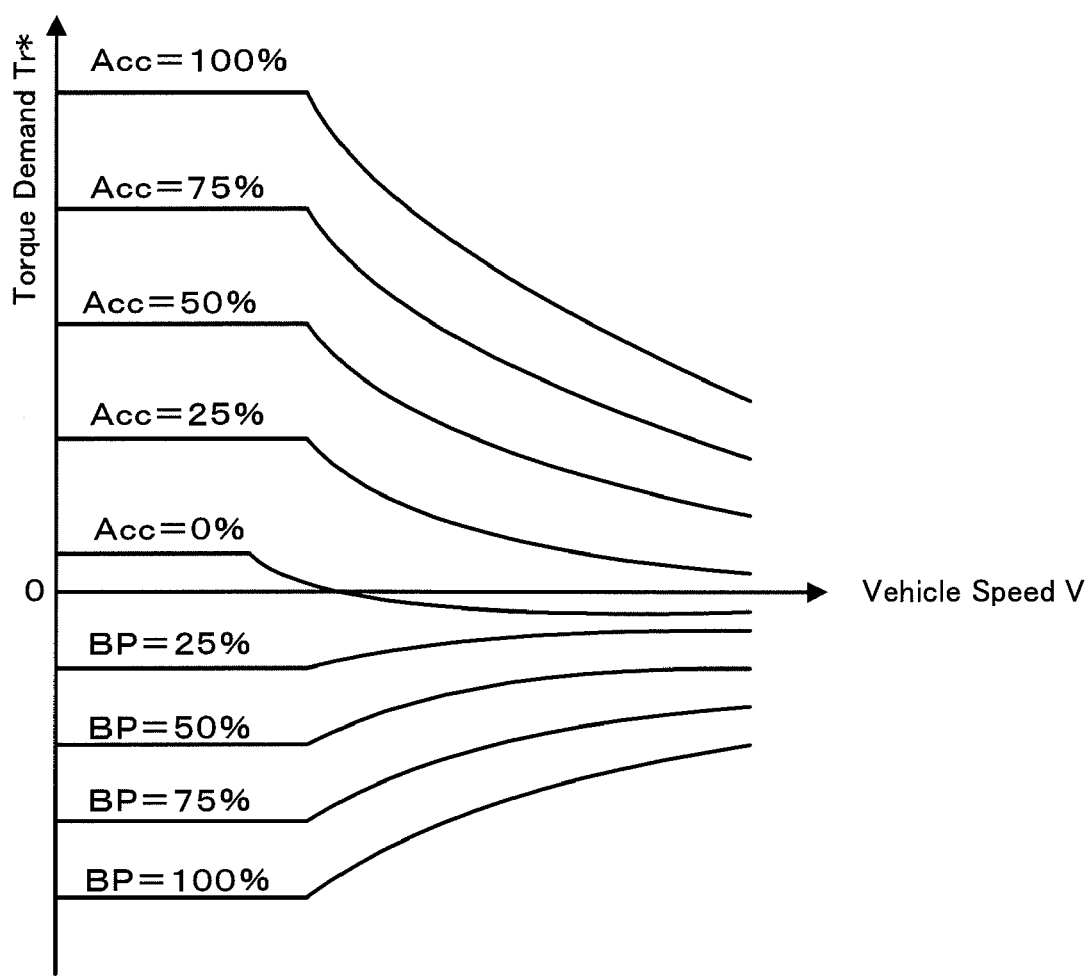
FIG. 4 shows one example of a torque demand setting map.

After the data input, the CPU 72 sets a torque demand Tr* to be output to the ring gear shaft 32a or the driveshaft, based on the input accelerator opening Acc, the input brake pedal position BP, and the input vehicle speed V (step S120). A concrete procedure of setting the torque demand Tr* in this embodiment stores in advance variations in torque demand Tr* against the vehicle speed V with regard to various settings of the accelerator opening Acc or the brake pedal position BP as a torque demand setting map in the ROM 74 and reads the torque demand Tr* corresponding to the given accelerator opening Acc or the given brake pedal position BP and the given vehicle speed V from this torque demand setting map. One example of the torque demand setting map is shown in FIG. 4.

Figure 5:
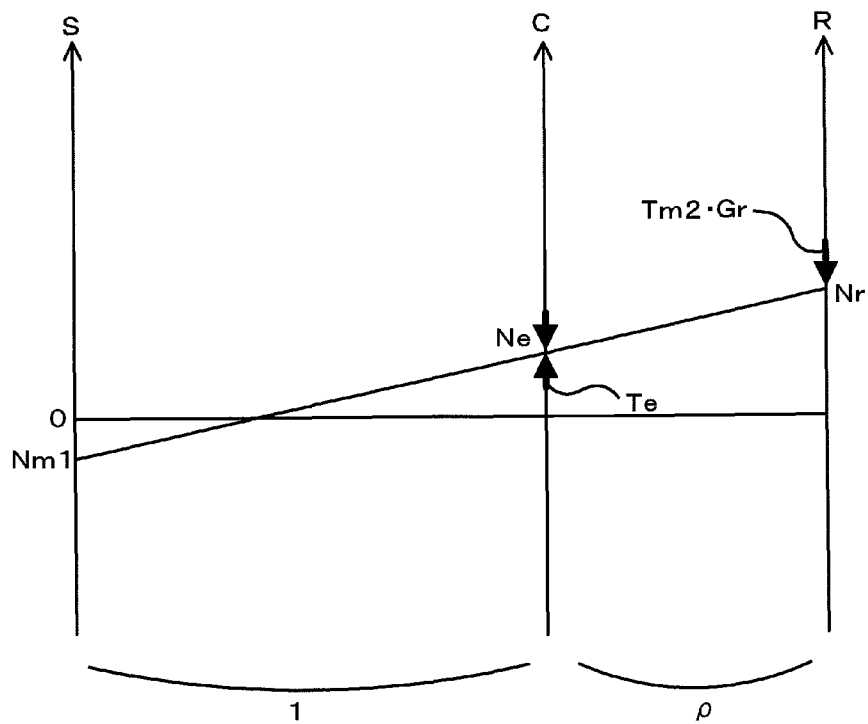
FIG. 5 is an alignment chart showing torque-rotation speed dynamics of rotational elements in a power distribution integration mechanism under self-sustaining operation of the engine at a stop rotation speed Nstop.

The CPU 72 successively determines whether the input rotation speed Ne of the engine 22 is higher than a preset reference speed Nref, which is lower than the stop rotation speed Nstop (step S130), whether the rotation speed Ne of the engine 22 sufficiently approaches to the stop rotation speed Nstop (step S140), and whether a preset time period has elapsed since the sufficient approach of the rotation speed Ne to the stop rotation speed Nstop (step S150). The reference speed Nref will be explained later. The time period is set as a wait time for stable operation of the engine 22 at the stop rotation speed Nstop and is equal to, for example, 0.5 seconds, 1 second, or 2 seconds. Immediately after the output of the control signal for the self-sustaining operation of the engine 22 at the stop rotation speed Nstop, the rotation speed Ne of the engine 22 is higher than the stop rotation speed Nstop. An affirmative answer (Ne>Nref) is accordingly given at step S130, while a negative answer (Ne≠Nstop or no elapse of the preset time period) is given at either step S140 or step S150. In this case, the engine 22 is under a decrease of its rotation speed Ne by fuel cutoff or another means or is under self-sustaining operation at the stop rotation speed Nstop. There is accordingly no need of torque output from the motor MG1. A torque command Tm1* of the motor MG1 is accordingly set to 0 and is sent to the motor ECU 40 (step S160). The motor ECU 40 receives the torque command Tm1* set to 0 and performs switching control of switching elements included in the inverter 41 to make the output torque of the motor MG1 equal to 0. FIG. 5 is an alignment chart showing torque-rotation speed dynamics of the rotational elements in the power distribution integration mechanism 30 under self-sustaining operation of the engine 22 at the stop rotation speed Nstop. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents a rotation speed Nr of the ring gear 32 obtained by dividing the rotation speed Nm2 of the motor MG2 by a gear ratio Gr of the reduction gear 35. Two arrows on the axis 'C' respectively show a torque Te output from the engine 22 to maintain the rotation of the engine 22 and a torque applied by the sliding friction and the compression work caused by the rotation of the engine 22. One arrow on the axis 'R' shows a torque output from the motor MG2 to the ring gear shaft 32a via the reduction gear 35.

After setting the torque command Tm1* of the motor MG1 to 0, the CPU 72 calculates a lower torque restriction Tmin as an allowable minimum torque output from the motor MG2 according to Equation (1) given below (step S220):

$$Tmin=(Win-Tm1^{*}\cdot Nm1)/Nm2 \quad (1)$$

The lower torque restriction Tmin is obtained by dividing a difference between the input limit Win of the battery 50 and power consumption (power generation) of the motor MG1, which is the product of the calculated torque command Tm1* (equal to 0 in this case) and the current rotation speed Nm1 of the motor MG1, by the current rotation speed Nm2 of the motor MG2. The CPU 72 then calculates a tentative motor torque Tm2tmp to be output from the motor MG2 from the torque demand Tr*, the torque command Tm1* of the motor MG1 (equal to 0 in this case), the gear ratio ρ of the power distribution integration mechanism 30, and the gear ratio Gr of the reduction gear 35 according to Equation (2) given below (step S230):

$$Tm2tmp=(T^{*}+Tm1^{*}/\rho)/Gr \quad (2)$$

The CPU 72 then limits the calculated tentative motor torque Tm2tmp by the lower torque restriction Tmin to set a torque command Tm2* of the motor MG2 and sends the setting of the torque command Tm2* to the motor ECU 40 (step S240). The motor ECU 40 receives the setting of the torque command Tm2* and performs switching control of switching elements included in the inverter 42 to ensure output of a torque equivalent to the torque command Tm2* from the motor MG2. Setting the torque command Tm2* of the motor MG2 in this manner sets the torque demand Tr* to be output to the ring gear shaft 32a or the driveshaft as a torque restricted in a range of the input limit Win of the battery 50, thus enabling regenerative of a greater portion of the kinetic energy of the hybrid vehicle 20 as electric power. Equation (2) is readily introduced from the alignment chart of FIG. 5.

The CPU 72 subsequently subtracts the product of the torque command Tm2* of the motor MG2 and the gear ratio Gr of the reduction gear 35 from the torque demand Tr* to set a brake torque command Tb* as a braking force to be applied to the drive wheels 63a and 63b and to the driven wheels via the brake wheel cylinders 96a to 96d by the operation of the brake actuator 92 and sends the setting of the brake torque command Tb* to the brake ECU 94 (step S250). The rotation speed Ne of the engine 22 is then compared with a value '0' (step S260). When the rotation speed Ne of the engine 22 is not equal to 0, the engine stop-time drive control routine returns to step S110 for another data input. The brake ECU 94 receives the setting of the brake torque command Tb* and drives and controls the brake actuator 92 to apply the braking force to the drive wheels 63a and 63b and to the driven wheels and thereby ensure application of a brake torque equivalent to the brake torque command Tb*.

Figure 6:
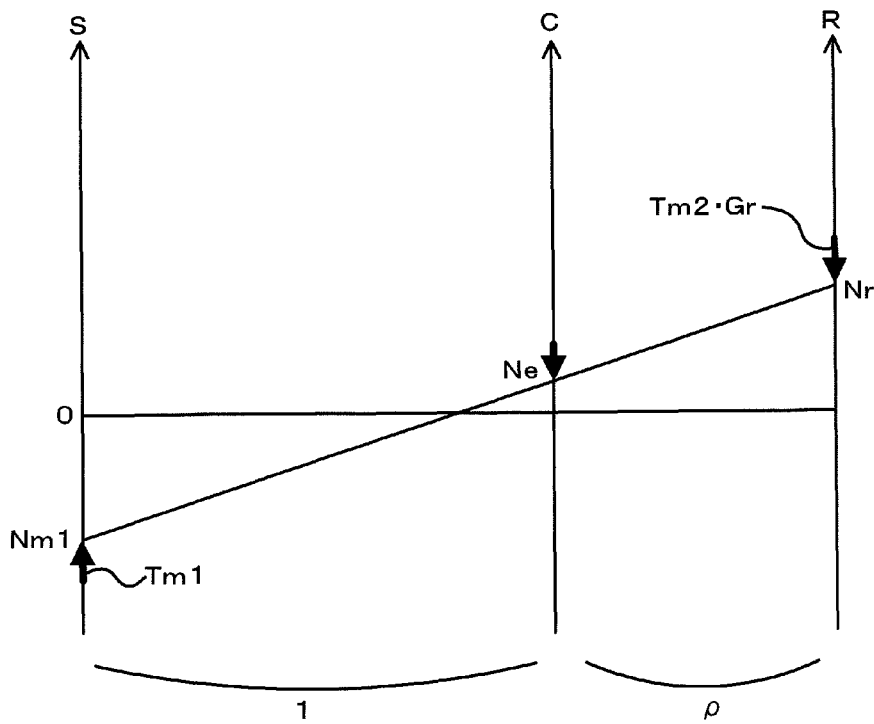
FIG. 6 is an alignment chart showing torque-rotation speed dynamics of the rotational elements in the power distribution integration mechanism in the course of smoothly decreasing the rotation speed of the engine under a cutoff condition of fuel supply to the engine.

Upon determination that the preset time period has elapsed since the start of the self-sustaining operation of the engine 22 at the stop rotation speed Nstop (steps S130 to S150), the CPU 72 sends a fuel cutoff command to the engine ECU 24 to stop the fuel supply to the engine 22 and the ignition (step S170) and sets a rotation speed-decreasing, vibration-suppressing torque to the torque command Tm1* of the motor MG1 and sends the setting of the torque command Tm1* to the motor ECU 40 (step S180). The rotation speed-decreasing, vibration-suppressing torque is set according to the crank angle CA to smoothly decrease the rotation speed of the engine 22 and suppress the potential vibration caused by the decreased rotation of the engine 22. Until the rotation speed Ne of the engine 22 decreases to or below the preset reference speed Nref (step S130), the engine stop-time drive control routine repeats the data input (step S110), the setting of the torque demand Tr* (step S120), the setting of the torque command Tm1* of the motor MG1 and the transmission of the set torque command Tm1* to the motor ECU 40 (step S180), the setting of the torque command Tm2* of the motor MG2 based on the setting of the torque command Tm1* and the transmission of the set torque command Tm2* to the motor ECU 40 (steps S220 to S240), and the setting of the brake torque command Tb* and the transmission of the set brake torque command Tb* to the brake ECU 94 (step S250). The setting of the torque command Tm1* of the motor MG1 in this manner and the transmission of the set torque command Tm1* to the motor ECU 40 smoothly decrease the rotation speed Ne of the engine 22 and effectively suppresses the potential vibration caused by the decreased rotation of the engine 22. FIG. 6 is an alignment chart showing torque-rotation speed dynamics of the rotational elements in the power distribution integration mechanism 30 in the course of smoothly decreasing the rotation speed Ne of the engine 22 under the cutoff condition of fuel supply to the engine 22.

Figure 7:
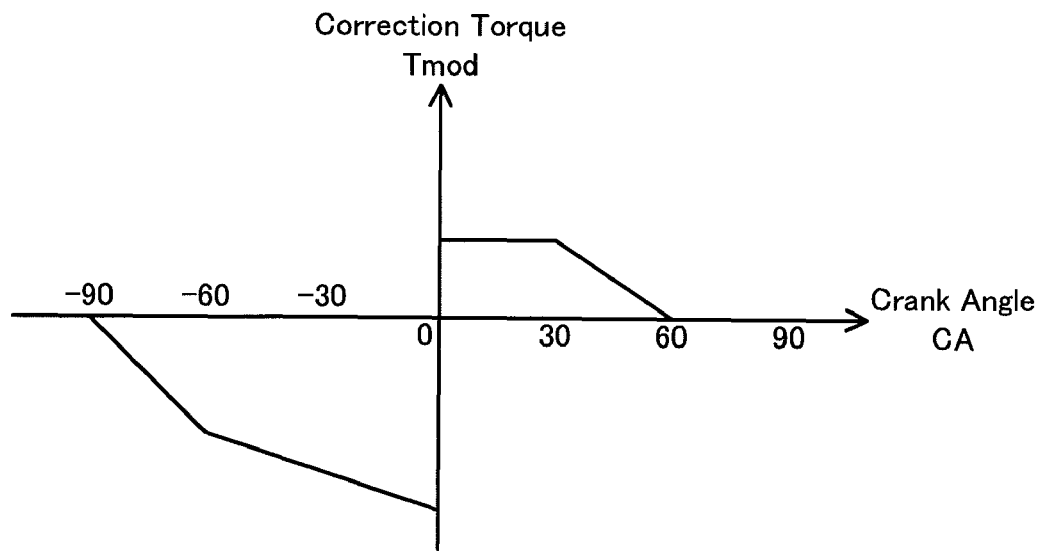
FIG. 7 shows one example of a correction torque setting map.
Figure 8:
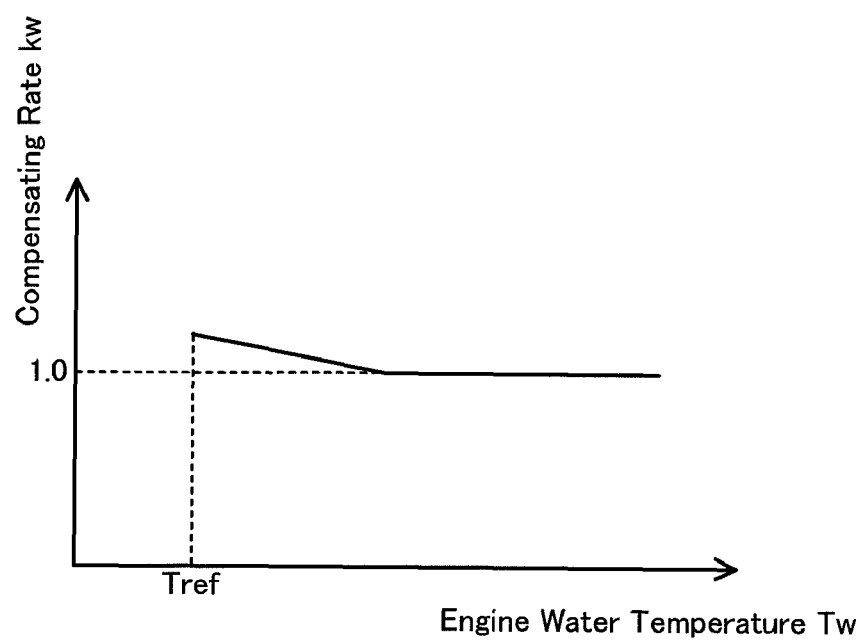
FIG. 8 shows one example of a compensating rate setting map.

Upon determination that the rotation speed Ne of the engine 22 decreases to or below the preset reference speed Nref (step S130), the CPU 72 checks the value of a correction torque setting flag F (step S190). When the correction torque setting flag F is equal to 0 at step S190, the CPU 72 sets a correction torque Tmod based on the crank angle CA and the engine water temperature Tw to prevent the crank angle CA of any cylinder in the engine 22 from exceeding a top dead center immediately before the stop of the engine 22 and sets the correction torque setting flag F to 1 (step S200). The reference speed Nref represents a correction start rotation speed of the engine 22 given as a criterion of starting correction of the torque command Tm1* of the motor MG1 with the correction torque Tmod to prevent the crank angle CA of any cylinder in the engine 22 from exceeding the top dead center immediately before the stop of the engine 22. The reference speed Nref is lower than the stop rotation speed Nstop as mentioned previously and is set equal to, for example, 600 rpm, 700 rpm, or 800 rpm. The correction torque setting flag F is reset to 0 by an initialization process (not shown) on the start of the engine stop-time drive control routine and is set to 1 in response to the setting of the correction torque Tmod. When the correction torque setting flag F is equal to 1 at step S190, this means that the correction torque Tmod has already been set and does not require resetting. Namely the correction torque Tmod is set corresponding to the crank angle CA and the engine water temperature Tw when the rotation speed Ne of the engine 22 reaches the preset reference speed Nref. A concrete procedure of setting the correction torque Tmod in this embodiment experimentally or otherwise specifies a relation between the crank angle CA and the correction torque Tmod at the time of stopping the operation of the engine 22 after completion of full warm-up of the engine 22 and stores in advance the specified relation as a correction torque setting map in the ROM 74. The procedure also experimentally or otherwise specifies a relation between the engine water temperature Tw and a compensating rate kw for compensating the correction torque Tmod and stores in advance the specified relation as a compensating rate setting map in the ROM 74. The procedure reads the correction torque Tmod corresponding to the given crank angle CA from the correction torque setting map, reads the compensating rate kw corresponding to the given engine water temperature Tw from the compensating rate setting map, and multiplies the read correction torque Tmod by the read compensating rate kw to set the result of the multiplication as the correction torque Tmod. One example of the correction torque setting map is shown in FIG. 7, and one example of the compensating rate setting map is shown in FIG. 8. In this embodiment, the correction torque Tmod is set to adjust the crank angle CA to an angle range of 30 to 60 degrees before the top dead center at the time of stopping the engine 22. As shown in FIG. 7, in a range of the crank angle CA before 0 degree (top dead center) at the rotation speed Ne of the engine 22 decreasing to the preset reference speed Nref, a torque applied in a direction of enabling a further decrease in rotation speed Ne of the engine 22 is set to the correction torque Tmod for the torque command Tm1* of the motor MG1 set to the rotation speed-decreasing, vibration-suppressing torque of smoothly decreasing the rotation speed Ne of the engine 22 and suppressing the potential vibration caused by the decreased rotation of the engine 22. In a range of the crank angle CA after 0 degree (top dead center) at the rotation speed Ne of the engine 22 decreasing to the preset reference speed Nref, on the other hand, a torque applied in a direction of preventing a further decrease in rotation speed Ne of the engine 22 is set to the correction torque Tmod. As shown in FIG. 8, the compensating rate kw is set to 0 in a temperature range of the engine water temperature Tw of less than a preset reference temperature Tref. The compensating rate kw is set to values slightly greater than a value '1.0' in a relatively low temperature range of the engine water temperature Tw of not less than the preset reference temperature Tref. The compensating rate kw is set to the value '1.0' in a relatively high temperature range of the engine water temperature Tw of not less than the preset reference temperature Tref. The compensating rate kw is set to 0 at the engine water temperature Tw of less than the preset reference temperature Tref, because of the following reason. Under the low temperature condition of the engine 22, the engine 22 is often under non-ordinary control to warm up the engine 22. In this state, the correction of the torque command Tm1* of the motor MG1 with the correction torque Tmod often does not attain the expected effect of preventing an excess of the crank angle CA over the top dead center immediately before the stop of the engine 22. In order to avoid such ineffective correction, the compensating rate kw and thereby the correction factor Tmod are set equal to 0. The compensating rate kw is set to the slightly greater values than the value '1.0' in the relatively low temperature range of the engine water temperature Tw of not less than the preset reference temperature Tref. This is because the low engine water temperature Tw leads to the high viscosity of lubricating oil for the engine 22.

After setting the correction torque Tmod, the CPU 72 sets the torque command Tm1* of the motor MG1 by adding the set correction torque Tmod to the rotation speed-decreasing, vibration-suppressing torque set corresponding to the crank angle CA to smoothly decrease the rotation speed Ne of the engine 22 and suppress the potential vibration caused by the decreased rotation of the engine 22 and sends the setting of the torque command Tm1* to the motor ECU 40 (step S210). Until the rotation speed Ne of the engine 22 decreases to 0 (step S260), the engine stop-time drive control routine repeats the data input (step S110), the setting of the torque demand Tr* (step S120), the setting of the torque command Tm1* of the motor MG1 by addition of the correction torque Tmod and the transmission of the set torque command Tm1* to the motor ECU 40 (step S210), the setting of the torque command Tm2* of the motor MG2 based on the setting of the torque command Tm1* and the transmission of the set torque command Tm2* to the motor ECU 40 (steps S220 to S240), and the setting of the brake torque command Tb* and the transmission of the set brake torque command Tb* to the brake ECU 94 (step S250). The engine stop-time drive control routine is terminated when the rotation speed Ne of the engine 22 decreases to 0 (step S260). Setting the sum of the rotation speed-decreasing, vibration-suppressing torque and the correction torque Tmod to the torque command Tm1* of the motor MG1 effectively prevents the crank angle CA of any cylinder in the engine 22 from exceeding the top dead center immediately before the stop of the engine 22 and suppresses the potential vibration caused by the excess of the crank angle CA over the top dead center. As explained above, the engine 22 stops in the angle range of 30 degrees to 60 degrees before the top dead center. After completion of the engine stop-time drive control routine, a motor drive-mode drive control routine (not shown) is repeatedly executed in the motor drive mode where the hybrid vehicle 20 is driven with only the output torque of the motor MG2.

Figure 9:
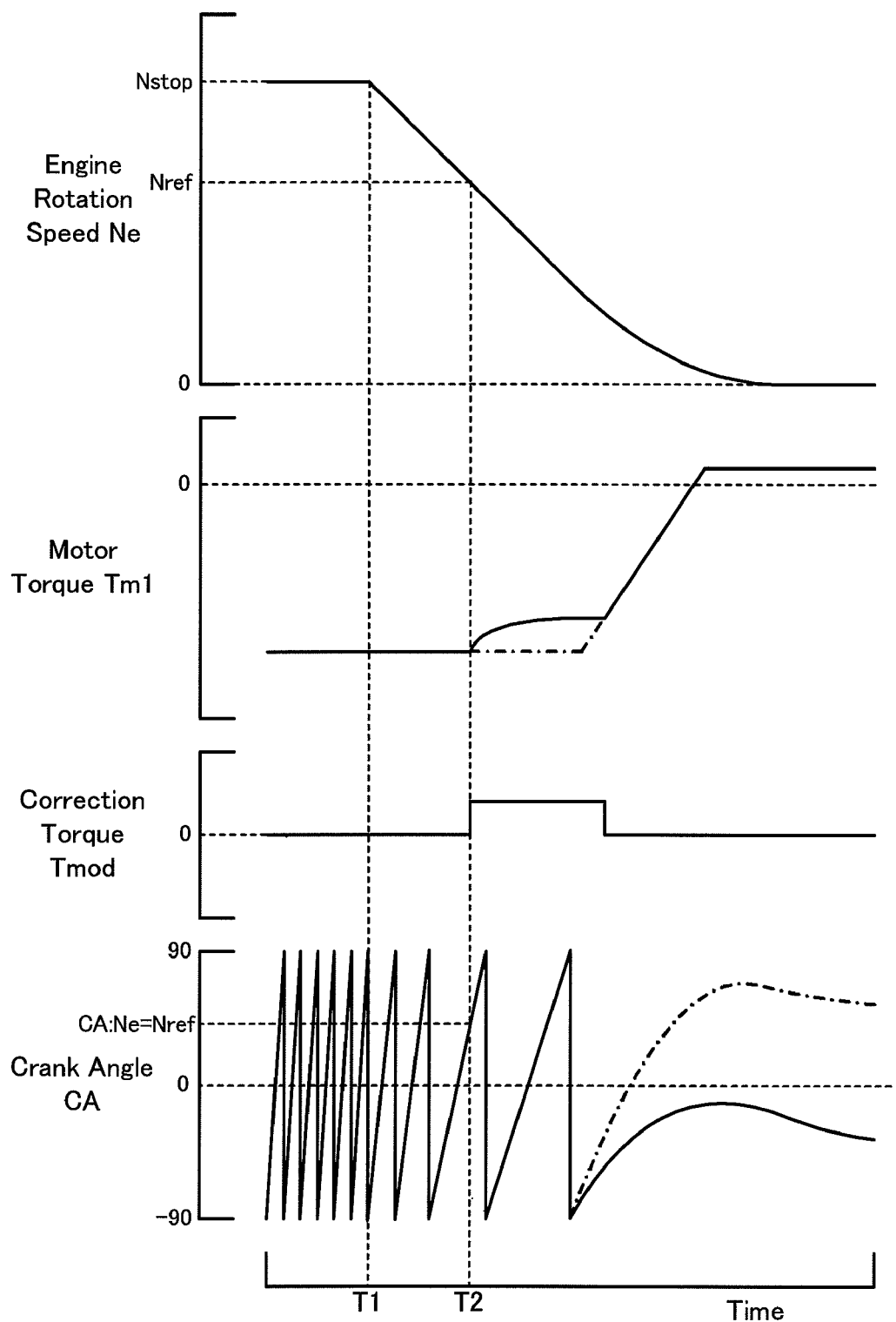
FIG. 9 is a timing chart showing time changes of a rotation speed Ne of the engine, an output torque Tm1 of a motor MG1, a correction torque Tmod, and a crank angle CA at a time of stopping the engine.

FIG. 9 is a timing chart showing time changes of the rotation speed Ne of the engine 22, the output torque Tm1 of the motor MG1, the correction torque Tmod, and the crank angle CA at a time of stopping the engine 22 after the self-sustaining operation of the engine 22 at the stop rotation speed Nstop. The solid line curves show the time changes in the embodiment with correction of the torque command Tm1* of the motor MG1 by the correction torque Tmod, and the one-dot chain line curves show the time changes in a comparative example without such correction by the correction torque Tmod. At a time T1 after elapse of the preset time period since the start of the self-sustaining operation of the engine 22 at the stop rotation speed Nstop, the drive control cuts off the fuel supply to the engine 22 and causes the motor MG1 to output the rotation speed-decreasing, vibration-suppressing torque of smoothly decreasing the rotation speed Ne of the engine 22 and suppressing the potential vibration caused by the decreased rotation of the engine 22. At a time T2 when the rotation speed Ne of the engine 22 reaches the preset reference speed Nref, the drive control sets the correction torque Tmod corresponding to the crank angle CA and causes the motor MG1 to output the total torque of the rotation speed-decreasing, vibration-suppressing torque and the correction torque Tmod. In the comparative example without the correction by the correction torque Tmod (shown by the one-dot chain line curve), the crank angle CA exceeds 0 degree or the top dead center immediately before the stop of the engine 22. In the embodiment with the correction by the correction torque Tmod (shown by the solid line curve), on the other hand, the crank angle CA does not exceed 0 degree or the top dead center immediately before the stop of the engine 22 but is kept in the angle range of 30 degrees to 60 degrees before the top dead center at the time of stopping the engine 22.

As described above, at the time of stopping the operation of the engine 22, the hybrid vehicle 20 of the embodiment controls the motor MG1 to output the total torque of the rotation speed-decreasing, vibration-suppressing torque and the correction torque Tmod. The correction torque Tmod is set based on the crank angle CA and the engine water temperature Tw at the rotation speed Ne of the engine 22 decreasing to the preset reference speed Nref. Such control prevents the crank angle CA from exceeding 0 degree or the top dead center immediately before the stop of the engine 22 and enables the engine 22 to stop in the angle range of 30 degrees to 60 degrees before the top dead center. Such drive control effectively suppresses the potential vibration caused by the excess of the crank angle CA over the top dead center immediately before the stop of the engine 22. At the time of stopping the operation of the engine 22, the engine 22 is controlled to perform the self-sustaining operation at the stop rotation speed Nstop for the preset time period. Such drive control enables the engine 22 to be kept in the steady state prior to its operation stop and thus more effectively prevents the crank angle CA from exceeding the top dead center immediately before the stop of the engine 22. The motor MG1 is controlled to output the rotation speed-decreasing, vibration-suppressing torque, while the rotation speed Ne of the engine 22 is decreased. Such control desirably ensures a smooth decrease in rotation speed Ne of the engine 22 and effectively suppresses the potential vibration that may arise in the course of decreasing the rotation speed Ne of the engine 22. The correction of the torque command Tm1* of the motor MG1 with the correction torque Tmod is not performed when the engine water temperature Tw is lower than the preset reference temperature Tref at the time of stopping the operation of the engine 22. This desirably avoids the ineffective correction.

In the hybrid vehicle 20 of the embodiment, at the time of stopping the operation of the engine 22, the engine 22 is controlled to perform the self-sustaining operation at the stop rotation speed Nstop for the preset time period. This is, however, neither essential nor restrictive, and the self-sustaining operation of the engine 22 may be at any desired rotation speed for any desired time period. Another modification may omit the control for the self-sustaining operation of the engine 22 at the stop rotation speed Nstop for the preset time period at the time of stopping the operation of the engine 22.

In the hybrid vehicle 20 of the embodiment, at the time of stopping the operation of the engine 22, the motor MG1 is controlled to output the total torque of the rotation speed-decreasing, vibration-suppressing torque and the correction torque Tmod. The correction torque Tmod is set based on both the crank angle CA and the engine water temperature Tw at the rotation speed Ne of the engine 22 decreasing to the preset reference speed Nref. One modification may control the motor MG1 to output a total torque of the rotation speed-decreasing, vibration-suppressing torque and a correction torque Tmod at the time of stopping the operation of the engine 22. The correction torque Tmod may be set irrespective of the engine water temperature Tw but based on only the crank angle CA at the rotation speed Ne of the engine 22 decreasing to the preset reference speed Nref.

In the hybrid vehicle 20 of the embodiment, the correction of the torque command Tm1* of the motor MG1 with the correction torque Tmod is not performed when the engine water temperature Tw is lower than the preset reference temperature Tref at the time of stopping the operation of the engine 22. One modification may perform the correction of the torque command Tm1* of the motor MG1 with the correction torque Tmod even when the engine water temperature Tw is lower than the preset reference temperature Tref.

In the hybrid vehicle 20 of the embodiment, the drive control at the time of stopping the operation of the engine 22 enables the engine 22 to stop in the angle range of 30 degrees to 60 degrees before the top dead center. As long as the crank angle CA does not exceed the top dead center immediately before the stop of the engine 22, the engine 22 may be controlled to stop in any suitable angle range other than the angle range of 30 degrees to 60 degrees before the top dead center.

In the hybrid vehicle 20 of the embodiment, at the time of stopping the operation of the engine 22, the motor MG1 is controlled to output the total torque of the rotation speed-decreasing, vibration-suppressing torque and the correction torque Tmod. The correction torque Tmod is set based on both the crank angle CA and the engine water temperature Tw at the rotation speed Ne of the engine 22 decreasing to the preset reference speed Nref. The engine water temperature Tw may be replaced by the direct temperature of the engine 22 or the temperature of any suitable medium reflecting the temperature of the engine 22.

Figure 10:
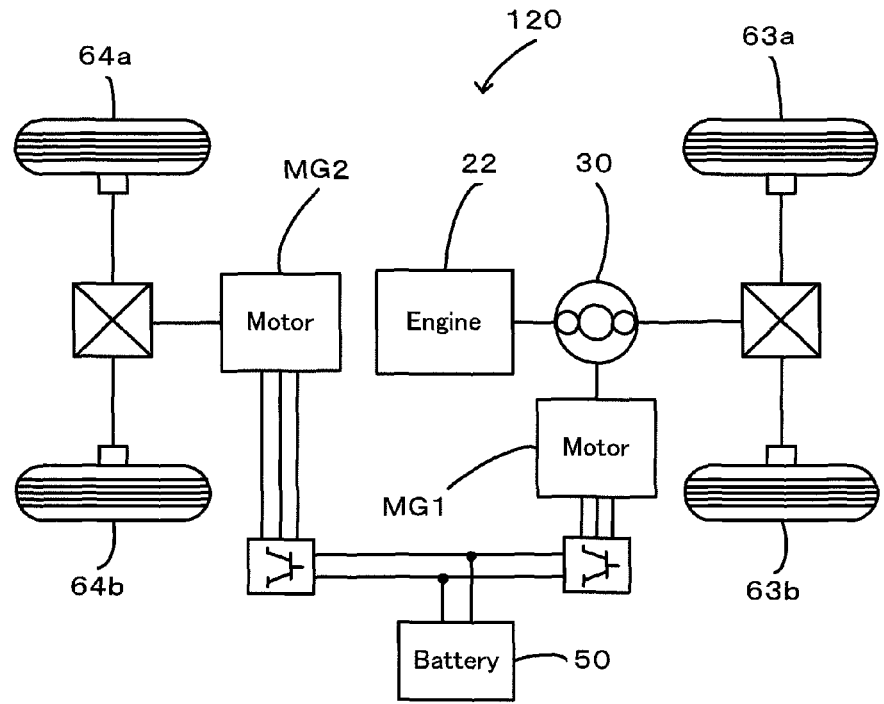
FIG. 10 schematically illustrates the configuration of another hybrid vehicle in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 10. In the hybrid vehicle 120 of FIG. 10, the power of the motor MG2 is connected to another axle (an axle linked with wheels 64a and 64b) that is different from the axle connecting with the ring gear shaft 32a (the axle linked with the drive wheels 63a and 63b).

Figure 11:
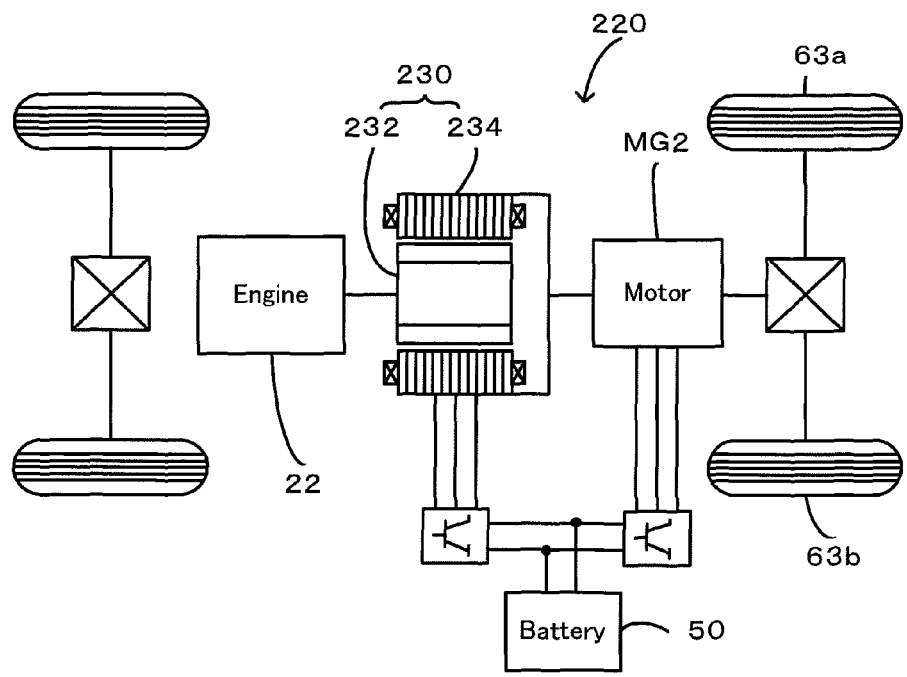
FIG. 11 schematically illustrates the configuration of still another hybrid vehicle in another modified example.

In the hybrid vehicle 20 of the embodiment, the power of the engine 22 is transmitted via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 11. The hybrid vehicle 220 of FIG. 11 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

Drive control basically following the engine stop-time drive control routine explained above can be performed in any structure including both an internal combustion engine and a motor configured to enable torque output to an output shaft of the internal combustion engine. The principle of the invention is thus applicable to an internal combustion engine system or a power output apparatus that includes an internal combustion engine and a motor configured to enable torque output to an output shaft of the internal combustion engine and is mounted on any of diverse moving bodies including various automobiles and other vehicles, boats and ships, and air craft, as well as to the internal combustion engine system or the power output apparatus built in any of stationary equipment including construction machinery. Other applications of the invention include a control method of such an internal combustion engine system and a control method of such a power output apparatus.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to the manufacturing industries of internal combustion engines and power output apparatuses and their relevant industries.

The invention claimed is:

1. An internal combustion engine system including an internal combustion engine and a motor configured to enable torque output to an output shaft of the internal combustion engine, the internal combustion engine system comprising:
   a rotational position sensor constructed to detect a rotational position of the output shaft of the internal combustion engine;
   a rotation speed sensor constructed to measure a rotation speed of the internal combustion engine as an engine rotation speed;
   a temperature sensor constructed to measure a temperature of a medium reflecting a temperature of the internal combustion engine; and
   an engine stop-time controller configured to, in response to a request for stopping operation of the internal combustion engine, control the internal combustion engine to stop fuel supply to the internal combustion engine and ignition,
   until the engine rotation speed measured by the rotation speed sensor decreases to a correction start rotation speed, the engine stop-time controller controlling the motor to output a rotation speed-decreasing torque that is a torque for smoothly decreasing the rotation speed of the internal combustion engine,
   after the engine rotation speed measured by the rotation speed sensor decreases to the correction start rotation speed, with a view to preventing the rotational position of the output shaft from exceeding a top dead center immediately before a stop of the internal combustion engine, the engine stop-time controller controlling the motor to output an engine stop torque as a sum of a correction torque and the rotation speed-decreasing torque, where the correction torque is set corresponding to the rotational position of the output shaft detected by the rotational position sensor at the measured engine rotation speed decreasing to the correction start rotation speed,
   when the temperature measured by the temperature sensor is not less than a preset reference temperature at the measured engine rotation speed decreasing to the correction start rotation speed, the engine stop-time controller using a torque corresponding to the temperature measured by the temperature sensor as the correction torque,
   when the temperature measured by the temperature sensor is less than the preset reference temperature at the measured engine rotation speed decreasing to the correction start rotation speed, the engine stop-time controller using the rotation speed-decreasing torque as the engine stop torque.

2. The internal combustion engine system in accordance with claim 1, wherein the engine stop-time controller sets the correction torque to an adjustment torque for adjusting the rotational position of the output shaft to an angle range of 30 degrees to 60 degrees before the top dead center at the stop of the internal combustion engine.

3. The internal combustion engine system in accordance with claim 1, wherein the engine stop-time controller controls the internal combustion engine to stop the fuel supply to the internal combustion engine and the ignition after operation of the internal combustion engine at a preset rotation speed of higher than the correction start rotation speed for a preset time period.

4. A control method of an internal combustion engine system including an internal combustion engine and a motor configured to enable torque output to an output shaft of the internal combustion engine,
   at a time of stopping operation of the internal combustion engine, the control method controlling the internal combustion engine to stop fuel supply to the internal combustion engine and ignition,
   until a rotation speed of the internal combustion engine decreases to a correction start rotation speed, the control method controlling the motor to output a rotation speed-decreasing torque that is a torque for smoothly decreasing the rotation speed of the internal combustion engine,
   after the rotation speed of the internal combustion engine decreases to the correction start rotation speed, with a view to preventing a rotational position of the output shaft of the internal combustion engine from exceeding a top dead center immediately before a stop of the internal combustion engine, the control method controlling the motor to output an engine stop torque as a sum of a correction torque and the rotation speed-decreasing torque and stopping the operation of the internal combustion engine, where the correction torque is set corresponding to the rotational position of the output shaft of the internal combustion engine at the rotation speed of the internal combustion engine decreasing to the correction start rotation speed, when a temperature of the internal combustion engine is not less than a preset reference temperature at the rotation speed of the internal combustion engine decreasing to the correction start rotation speed, the control method using a torque corresponding to the temperature of the internal combustion engine as the correction torque, when the temperature of the internal combustion engine is less than the preset reference temperature at the rotation speed of the internal combustion engine decreasing to the correction start rotation speed, the control method using the rotation speed-decreasing torque as the engine stop torque.

* * * * *